(12) United States Patent
Harwood et al.

(10) Patent No.: US 8,435,634 B2
(45) Date of Patent: May 7, 2013

(54) FABRIC BATTING TAPE

(76) Inventors: Linda J. Harwood, Northridge, CA (US); Jeanne Harwood, Northridge, CA (US)

( * ) Notice: Subject to any disclaimer, the term of this patent is extended or adjusted under 35 U.S.C. 154(b) by 0 days.

(21) Appl. No.: 12/931,099

(22) Filed: Jan. 25, 2011

(65) Prior Publication Data

US 2012/0186738 A1    Jul. 26, 2012

(51) Int. Cl.
*B32B 5/00*    (2006.01)
*B32B 33/00*    (2006.01)

(52) U.S. Cl.
USPC .......................................... 428/347; 428/66.6

(58) Field of Classification Search ............ 428/58, 428/63, 66.5, 349, 347; 156/304.3, 304.6, 156/304.7
See application file for complete search history.

(56) References Cited

U.S. PATENT DOCUMENTS

| | | | |
|---|---|---|---|
| 3,533,876 A * | 10/1970 | Burgess | ..................... 156/304.4 |
| 3,747,776 A | 7/1973 | Gross | |
| 4,416,713 A * | 11/1983 | Brooks | ........................... 156/64 |
| 5,437,228 A | 8/1995 | Uland | |
| 5,497,701 A | 3/1996 | Uland | |
| 5,593,395 A * | 1/1997 | Martz | ........................... 604/304 |
| 5,676,785 A | 10/1997 | Samonides | |
| 6,755,321 B2 | 6/2004 | Solovay et al. | |
| 7,097,040 B1 | 8/2006 | Gutentag | |
| 7,458,177 B2 | 12/2008 | Sandel et al. | |
| 2003/0044563 A1 * | 3/2003 | Kocinec et al. | ................. 428/63 |

* cited by examiner

*Primary Examiner* — Linda L Gray
(74) *Attorney, Agent, or Firm* — Albert O. Cota

(57) ABSTRACT

A fabric batting tape (10) that is utilized to fuse two pieces of material (24,28) together. The fabric batting tape (10) is comprised of a knitted fabric strip (12) having an upper surface (14) and a lower surface (16), and a hot-melt adhesive (22) that is located on the lower surface (16). The two pieces of material (24,28) are placed together, with a side edge (26) of one piece of the material (24) abutting a side edge (30) of the other piece (28). A length of the knitted fabric strip (12) is placed on top of the two pieces of material (24,28) with the adhesive lower surface (16) contacting the upper surfaces of the two pieces of material. When heat and pressure are applied via a heating element to the fabric strip (12), the heat activates the adhesive thereby creating a secure permanent fuse which maintains the two pieces of material (24,28) together along with the knitted fabric strip (12).

2 Claims, 4 Drawing Sheets

FABRIC BATTING TAPE

This utility patent application claims priority of Provisional Patent Application No. 61/296,622 filed Jan. 20, 2010 and PCT International Patent Application No. PCT/US11/00045 filed 11 Jan. 2011.

TECHNICAL FIELD

The invention generally pertains to fabric assembly and mending products, and more specifically to a heat-activated fabric batting tape for fining two pieces of material together.

BACKGROUND ART

One of the most ubiquitous items used in the daily lives of humans is clothing. For millions of years humans have sought to cover their bodies, or certain parts of their bodies, for protection against injury or inclement weather and for modesty. As time progressed clothing took on other personal and social purposes. Today clothing is still used to satisfy the original needs and also, for many people, as a sign of social status. The purchasing of clothing has become a key factor in the economic success of many individuals and businesses.

Clothing has also become more diversified. There are definite styles and types of clothing that are purpose specific, such as business attire and casual wear, as well as specialized clothing for certain occupations and events, such as athletic apparel.

Depending on the need/purpose, an article of clothing can be extremely durable and long-lasting, or it can be fragile and easily damaged. Regardless of how strong, well-made and durable an article of clothing is, or how fragile, any piece of clothing can be damaged under certain circumstances.

Since the majority of clothing is made of a fabric material, the most common damage that occurs is a rip or tear. Depending on how severe a rip or tear is, and where on the clothing it occurs, will determine whether the clothing can be repaired or is beyond repair. For small, discreet rips and tears, repairing the damage is typically an easy job requiring a minimal amount of stitching or the use of a patch.

Since the introduction of heat-activated patches, which are also known as iron-on patches, it was become very easy for an average person to quickly repair a torn or ripped article of clothing. Preferably, a patch will be made of the same or similar material that it is repairing.

Unfortunately, heat-activated patches are not applicable to all types of clothing. Until relatively recently there was significant difficulty in repairing a rip or tear in a stretchable material, such as an athletic jersey. There is now a heat-activated material that can be used to repair or fuse together stretchable fabric but typically the material is only available in large quantities. What is needed is a smaller quantity, readily accessible repair/fusing material that would allow a person to quickly and easily perform a repair or fuse multiple pieces of stretchable or non-stretchable fabric together.

A search of the prior art did not disclose literature or patents that read directly on the claims of the instant invention. However, the following U.S. patents are considered related.

| PAT. NO. | INVENTOR | ISSUED |
|---|---|---|
| 3,747,776 | Gross | 24 Jul. 1973 |
| 5,676,785 | Samonides | 14 Oct. 1997 |
| 7,458,177B2 | Sandel et al | 2 Dec. 2008 |

The U.S. Pat. No. 3,747,776 discloses a detachable pocket which is formed as a pouch-like element having at least one substantially flat face. The pocket is provided with an adhesive backing on the flat face and a removable cover which protects the adhesive backing. When the detachable pocket is used, the cover is removed and the adhesive backing of the detachable pocket is applied to a supporting surface.

The U.S. Pat. No. 5,676,785 discloses a pressure-sensitive adhesive-backed substrate such as a printed label which is produced on a release-coated carrier sheet with printed label indicia sandwiched between a pressure-sensitive adhesive layer and an overlying protecting, preferably transparent, thermoplastic layer. The process for producing the adhesive backed substrate features the extrusion of a water-based, pressure-sensitive acrylic adhesive layer onto the substrate in as near a dry state as possible without heat. Additionally, in the label-making process, the overlying thermoplastic layer also may be extruded.

The U.S. Pat. No. 7,458,177B2 discloses a flag for labeling drugs or medications provided in a medication cup. The invention has a cup section with an adhesive back surface peelably attached to a backing sheet. A flag section is attached to the cup section of the flag at a bend line. A flag strip also having an adhesive back surface is supplied on the backing sheet. The flag section is labeled with a marker or a preprinted label to indicate the contents.

| PAT. NO. | INVENTOR | ISSUED |
|---|---|---|
| 5,437,228 | Uland | 1 Aug. 1995 |
| 5,497,701 | Uland | 12 Mar. 1996 |
| 6,755,321B2 | Solovay et al | 29 Jun. 2004 |
| 7,097,040B1 | Gutentag | 29 Aug. 2006 |

DISCLOSURE OF THE INVENTION

A fabric batting tape that is utilized to secure two pieces of material together. The fabric batting tape is comprised of a knit fabric having an upper surface and a lower surface, and a hot-melt adhesive that is located on the lower surface of the knit fabric. The fabric batting tape will securely and permanently maintain two pieces of material together with a stretchable and washable or thy-cleanable fuse.

In view of the above disclosure, the primary object of the invention is to provide a fabric batting tape that can quickly and easily secure two pieces of material together.

In addition to the primary object it is also an object of the invention to provide a fabric batting tape that:

- can be used with many different types of material,
- can be colored to match a colored piece of material,
- can be easily cut to any length required,
- is significantly less time and effort consuming than other material securing methods such as stitching,
- can include indicia, and
- is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of a fabric batting tape. Although there are numerous methods of securing two or more pieces of fabric material together, the inventive fabric batting tape allows a person to quickly and easily repair or fuse multiple pieces of stretchable or non-stretchable material together.

Figure 1:
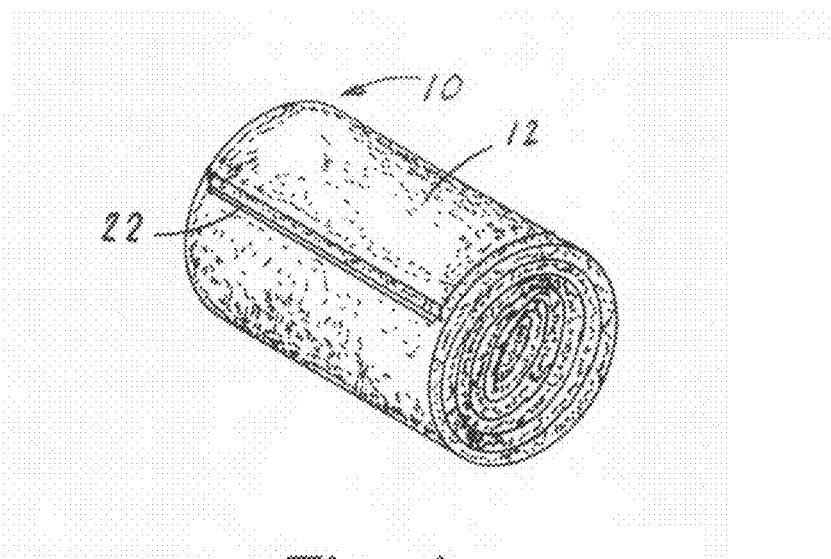
FIG. 1 is an orthographic side view of a roll of fabric batting tape.
Figure 2:
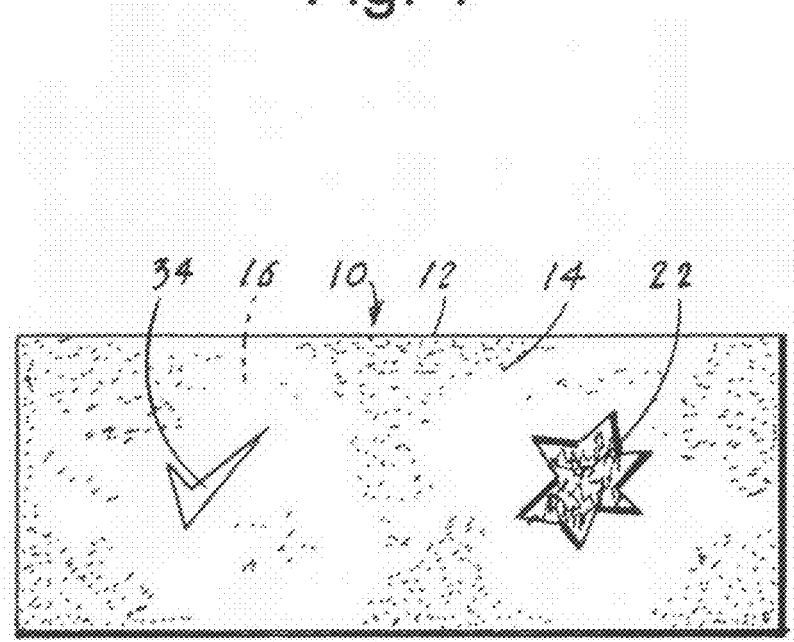
FIG. 2 is a top plan view of a piece of fabric batting tape that includes indicia and an opening showing a section of an adhesive.
Figure 3:
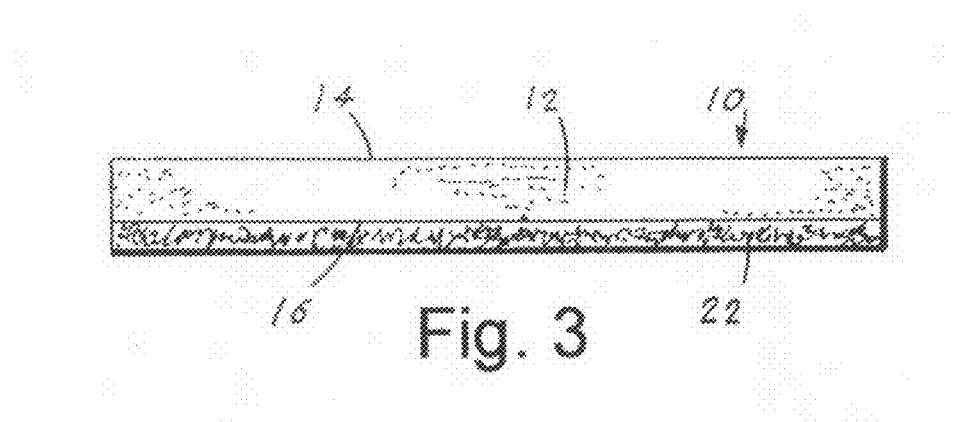
FIG. 3 is a side elevational view of a piece of fabric batting tape.

As shown in FIGS. 1-6, the fabric batting tape 10 is comprised of a knit fabric strip 12 having an upper surface 14 and a lower surface 16, as shown in FIGS. 2 and 3. A hot-melt adhesive 22 is located on the lower surface 16 of the knit fabric strip 12. For convenience and ease of use the knit fabric strip 12 is supplied in a roll, as shown in FIG. 1. The knit fabric strip 12 is made of a material that is selected from the group consisting of polyester, nylon, cotton, silk, wool, bamboo, natural fiber material or a blended material. The knit fabric strip 12 is washable and dry-cleanable, is stretchable, and has a width ranging from 0.5 inches (1.27 cm) to 5.0 inches (12.7 cm). Although a strip design is preferred, the fabric batting tape 10 can be supplied in any knitted geometric shape, such as a circle, triangle, and square. The strip design facilitates the use of the roll, as shown in FIG. 1, for supplying, storing and selling the fabric batting tape.

The hot-melt adhesive 22, as shown in FIGS. 2 and 3, is made of polyamides/amidoamines comprising water, Mirax HP, Intrasol and Tegopren 5847. The adhesive 22 has a fuse-line temperature ranging from 250 to 270 degrees F., (121.11 to 132.22 degree C.) at a pressure ranging from 2-3 BAR/PSI, and an application duration ranging from 8-12 seconds.

Figure 4:
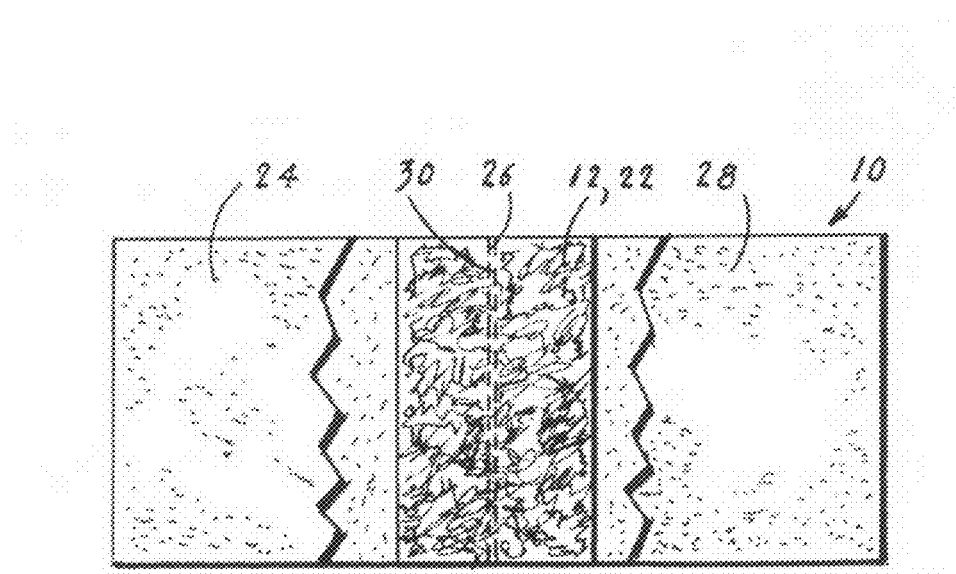
FIG. 4 is a top plan view showing two abutting pieces of material that are fused together by a piece of fabric batting tape.

When heat and pressure are applied to the knit fabric strip 12, the strip 12 will soften and glue penetrates into a material that is being fused together. A mechanical as well as a chemical bond is formed between the pieces of material, wherein upon cooling, the fabric strip regains its strength thereby creating a high-strength fuse. As shown in FIG. 4, the batting tape 10 is utilized to fuse at least two pieces of material 24,28 together.

Figure 5:
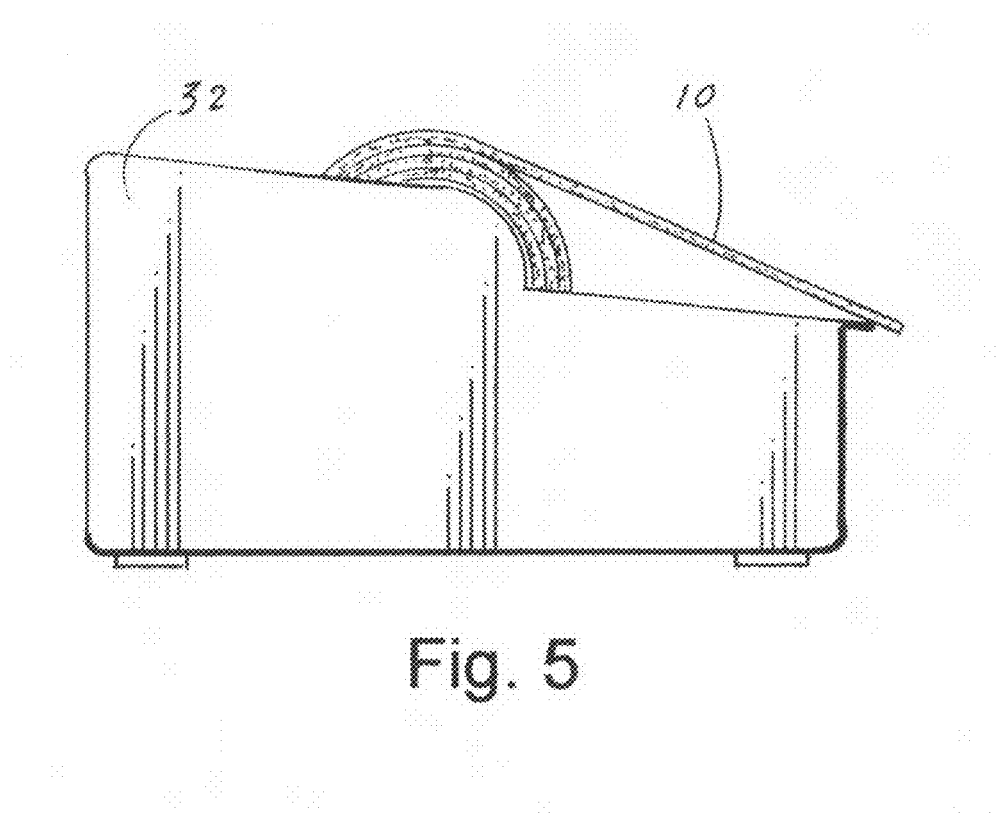
FIG. 5 is a side elevational view of a typical dispenser having attached a roll of fabric batting tape.

Additionally, a color tint (not shown) can be applied to the fabric strip 12 to allow the strip 12 to match or otherwise correspond to the color of the materials being fused. As shown in FIG. 2, indicia 34 can also be applied to the fabric strip 12. To provide a convenient and easy access to a roll of the fabric strip 12, a dispenser 32, as shown in FIG. 5, can be utilized.

Figure 6:
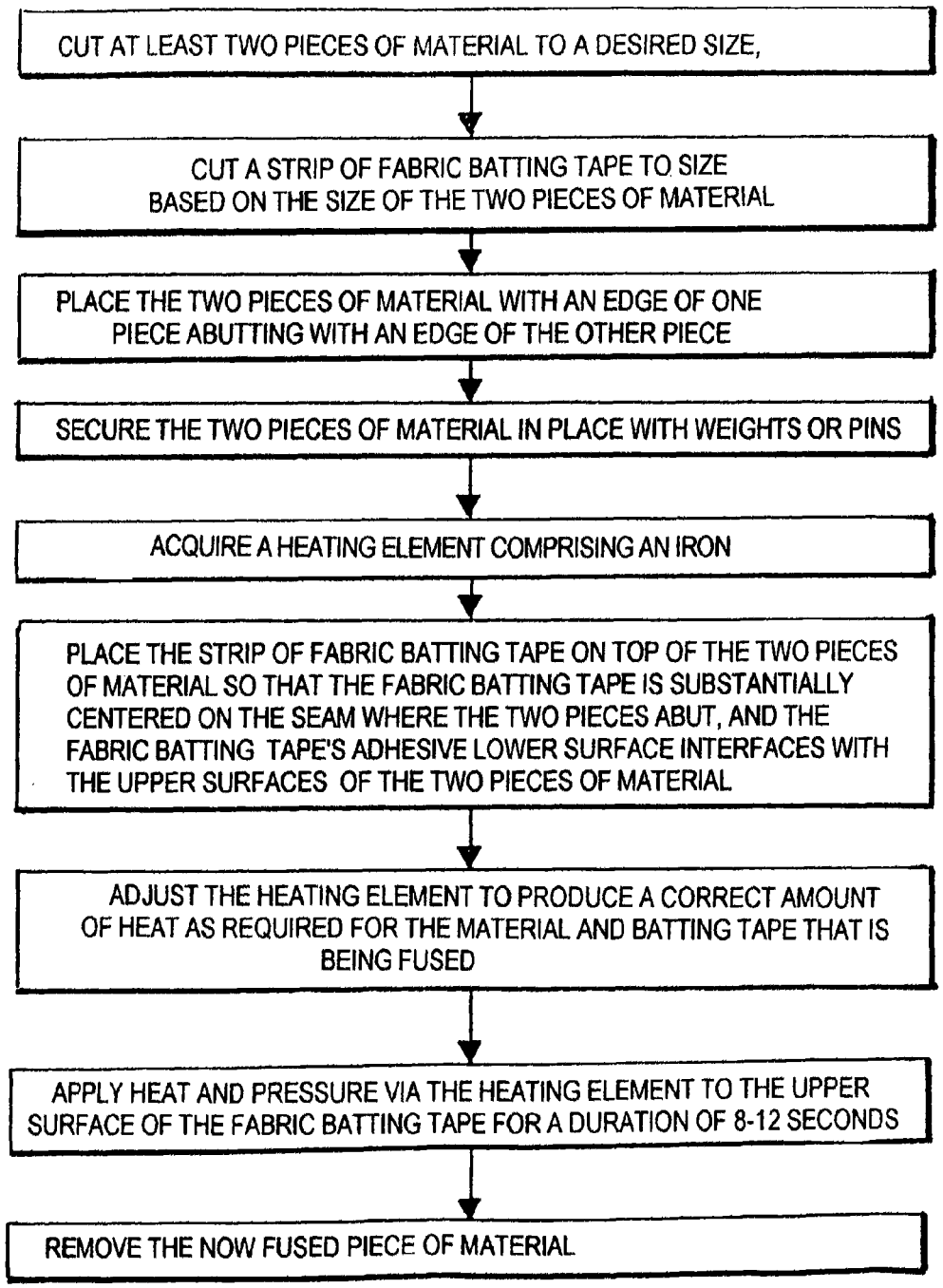
FIG. 6 is a block diagram illustrating the steps that are required to utilize the fabric batting tape.

The method for fusing at least two pieces of material 24,28 together utilizing an adhesive-backed fabric batting tape comprises the following steps, as shown in FIG. 6:

a) cut at least two pieces of material 24,28 to a desired size,
b) cut a strip of fabric batting tape 10 to a size based on the sizes of the two pieces of material 24,28,
c) place the two pieces of material 24,28 with an edge 26 of one piece abutting an edge 30 of the other piece,
d) secure the two pieces of material 24,28 in place with weights or pins,
e) acquire a heating element comprising an iron,
f) place the strip of fabric batting tape 10 on top of the two pieces of material so that the fabric batting strip is substantially centered on the seam where the two pieces abut, and the fabric batting's adhesive interfaces with the upper surfaces of the two pieces of material 24,28,
g) adjust the heating element to produce a correct amount of heat as required for the material and batting tape that is being fused,
h) apply heat and pressure via the heating element to the upper surface the fabric batting tape for a duration of 8-12 seconds, and
i) remove the now fused piece of material.

It should be noted that while a single strip of fabric batting tape is utilized in the above steps, two strips of batting tape can also be utilized. A single strip of fabric batting tape is placed on top of the material (as described in the above steps) and a strip of fabric batting tape can be placed under the material at substantially the same location along the seam where the two pieces of material abut. The use of two strips of fabric batting tape would provide a stronger fuse, which may be required or desired for certain applications/uses.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

FABRIC BATTING TAPE

Element Designation

For Convenience of the Examiner, not Part of the Specification

10 Fabric Batting Tape
12 Knitted Fabric Strip
14 Upper Surface
16 Lower Surface
22 Adhesive
24 Material
26 Side Edge
28 Material
30 Side Edge
32 Dispenser
34 Indicia

The invention claimed is:

1. A fabric batting tape that is utilized to fuse two pieces of batting material together, wherein said batting tape consists of:

a) a washable and dry-cleanable knitted fabric strip having an upper surface, a lower surface, and is made of a material that is selected from the group consisting of polyester, nylon, cotton, silk, wool, bamboo and natural fiber, and b) a hot-melt adhesive that is located on the lower surface of said fabric strip, and wherein the hot-melt adhesive has a fuse-line temperature ranging from 250 to 270 degrees F. at a pressure ranging from 2 to 3 BAR/PSI and an application duration range from 8 to 12 seconds, and wherein the two pieces of material are placed together, with a side edge of one piece abutting a side edge of the other piece, wherein a length of said batting tape is placed on top of the two pieces with the adhesive lower surface contacting the upper surfaces of the two pieces of material, wherein when heat and pressure are applied to the upper surface of said knit fabric strip, the heat activates the adhesive thereby creating a secure permanent fuse which maintains the two pieces of material together along with said fabric strip.

2. The fabric batting tape as specified in claim 1 wherein said hot-melt adhesive is made of polyamides/amidioamines.

\* \* \* \* \*